US012489246B2

(12) United States Patent
Acosta et al.

(10) Patent No.: US 12,489,246 B2
(45) Date of Patent: Dec. 2, 2025

(54) COMPONENT ATTACHMENT SYSTEM WITH PRIMARY AND SECONDARY LOCKING FEATURES

(71) Applicant: Aptiv Technologies AG, Schaffhausen (CH)

(72) Inventors: Erick Adrian Rodriguez Acosta, Fracc Quintas del Valle (MX); Naiki Alejandra Reynoso Galvan, Sterling Heights, MI (US)

(73) Assignee: Aptiv Technologies AG, Schaffhausen (CH)

( * ) Notice: Subject to any disclaimer, the term of this patent is extended or adjusted under 35 U.S.C. 154(b) by 437 days.

(21) Appl. No.: 17/994,521

(22) Filed: Nov. 28, 2022

(65) Prior Publication Data

US 2024/0178613 A1 May 30, 2024

(51) Int. Cl.
*H01R 13/627* (2006.01)
*H01R 13/506* (2006.01)

(52) U.S. Cl.
CPC ....... *H01R 13/6273* (2013.01); *H01R 13/506* (2013.01)

(58) Field of Classification Search
CPC .............. H01R 13/506; H01R 13/6272; H01R 13/6273
See application file for complete search history.

(56) References Cited

U.S. PATENT DOCUMENTS

| | | | | | |
|---|---|---|---|---|---|
| 4,212,415 | A * | 7/1980 | Neely | B65D 11/10 222/231 |
| 4,216,984 | A * | 8/1980 | Hofmann | E05C 19/06 292/91 |
| 6,648,669 | B1 | 11/2003 | Kim et al. | |
| 8,371,004 | B2 | 2/2013 | Huber et al. | |
| 10,842,032 | B2 * | 11/2020 | Reichert | H05K 5/0069 |
| 2008/0205029 | A1 * | 8/2008 | Fabrizi | H02G 3/14 361/829 |

* cited by examiner

*Primary Examiner* — Oscar C Jimenez
(74) *Attorney, Agent, or Firm* — Billion & Armitage

(57) ABSTRACT

A system for attaching a first component, e.g., a first housing component of an electrical assembly, to a second component, e.g., a second housing component of the electrical assembly includes a locking ramp and a first secondary lock attached to the first component. The first secondary lock has a first plurality of locking teeth located proximate to the locking ramp. The system further includes a locking latch having a cantilevered arm attached to the second component and terminated by a latch arm. The locking latch is configured to engage the locking ramp when the latch arm rides up and over the locking ramp. The cantilevered arm includes a second secondary lock having a second plurality of locking teeth that engages the first plurality of locking teeth as the latch engages the locking ramp.

16 Claims, 3 Drawing Sheets

COMPONENT ATTACHMENT SYSTEM WITH PRIMARY AND SECONDARY LOCKING FEATURES

TECHNICAL FIELD

This application is directed to a component attachment system that has primary locking features and secondary locking features.

BACKGROUND

Component-to-component attachment systems may include locating and locking features that are integral with one or the other of the components being joined. The attachment system includes flexible locking and locating features that move aside for engagement with stationary locking and locating features, after which the flexible locking features return toward their original position to secure the components to one another.

Flexible locking features that include cantilever elements are commonly used for electrical components, such as electrical distribution centers in motor vehicles, to attach a cover to a base of the electrical center or to mount the electrical center within the vehicle. These flexible locking features may also be used for device retention features, upper to lower housing retention, etc. These cantilever elements have the following attributes:

- The cantilever element may be longer, compared to a straight bar, without using more space, thus allowing lower deflection forces in compact applications;
- L and U-shaped cantilevers that are formed on the edge of an injection molded part do not require slides to be manufactured in an injection molding tool;
- The cantilever element does not experience a lot of strain and so multiple flexing cycles are possible without damaging the cantilever element; and
- The cantilever element may have a built-in stop, thereby inhibiting over flexing of the cantilever element.

The flexible locking features and stationary locking features typically include some dimensional tolerance to accommodate dimensional variation due to manufacturing processes used to form the features, e.g., injection molding. These dimensional tolerances typically result in a gap between the flexible locking features and the stationary locking features of the attachment system. The gap is also necessary to provide over travel between the flexible locking features and stationary locking features during the assembly in order for the flexible locking features and stationary locking features to properly engage. However, after assembly this gap also allows vibration between the joined components that may contribute to vibration related failure of the attachment system or the components.

SUMMARY

According to one or more aspects of the present disclosure, an electrical assembly includes a first housing component defining a locking ramp and a first secondary lock having a first edge defining a first plurality of locking teeth located proximate to the locking ramp. The assembly further includes a second housing component defining a locking latch having a cantilevered arm terminated by a latch arm configured to engage the locking ramp by riding up and over the locking ramp configured to secure the second housing component to the first housing component. The cantilevered arm includes a second secondary lock having a second edge defining a second plurality of locking teeth that engages the first plurality of locking teeth as the latch engages the locking ramp.

According to one or more aspects of the present disclosure, a system for attaching a first component to a second component includes a locking ramp and a first secondary lock attached to the first component. The first secondary lock has a first plurality of locking teeth located proximate to the locking ramp. The system also contains a locking latch having a cantilevered arm attached to the second component and terminated by a latch arm, The locking latch is configured to engage the locking ramp when the latch arm rides up and over the locking ramp. The cantilevered arm includes a second secondary lock having a second plurality of locking teeth that engages the first plurality of locking teeth as the latch engages the locking ramp.

BRIEF DESCRIPTION OF THE DRAWINGS

The present invention will now be described, by way of example with reference to the accompanying drawings, in which.

DETAILED DESCRIPTION

This disclosure is directed to a component attachment system having primary and secondary locking features and an electrical assembly, e.g., an electrical distribution center, incorporating this component attachment system.

The vibration/rattling problem caused by a gap between the primary flexible locking features and the stationary locking features may be solved by restricting the movement between primary flexible locking features and the stationary locking features. In order to restrict this movement, secondary locking features are incorporated into the primary flexible locking features and the stationary locking features. These secondary locking features that maintain a consistent gap distance, thereby inhibiting relative movement between the primary flexible locking features and the stationary locking features that may be caused by vibration.

Figure 1:
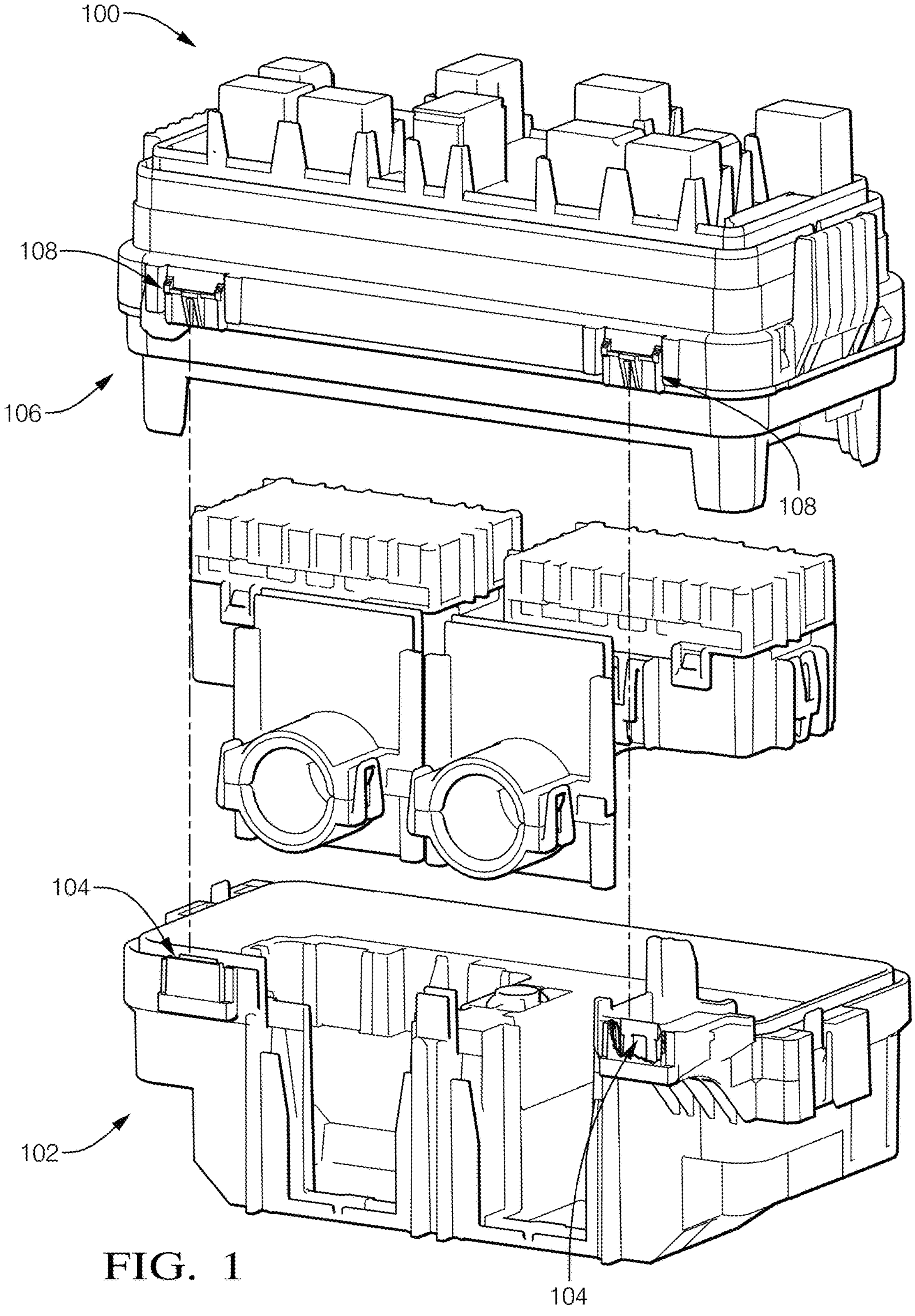
FIG. 1 illustrates an isometric view of an electrical component having a component attachment system according to some embodiments.
Figure 2:
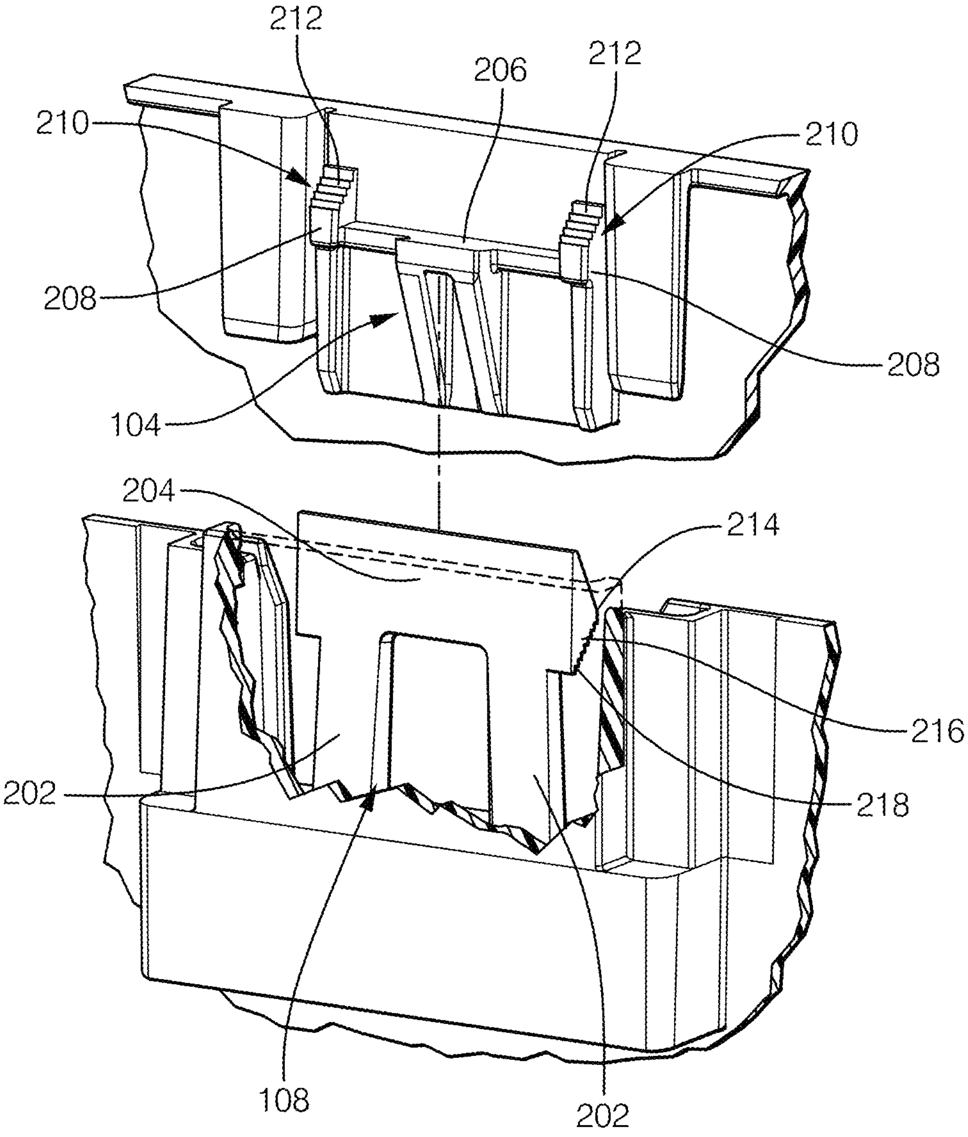
FIG. 2 illustrates an isometric view of the component attachment system prior to engagement according to some embodiments.
Figure 3:
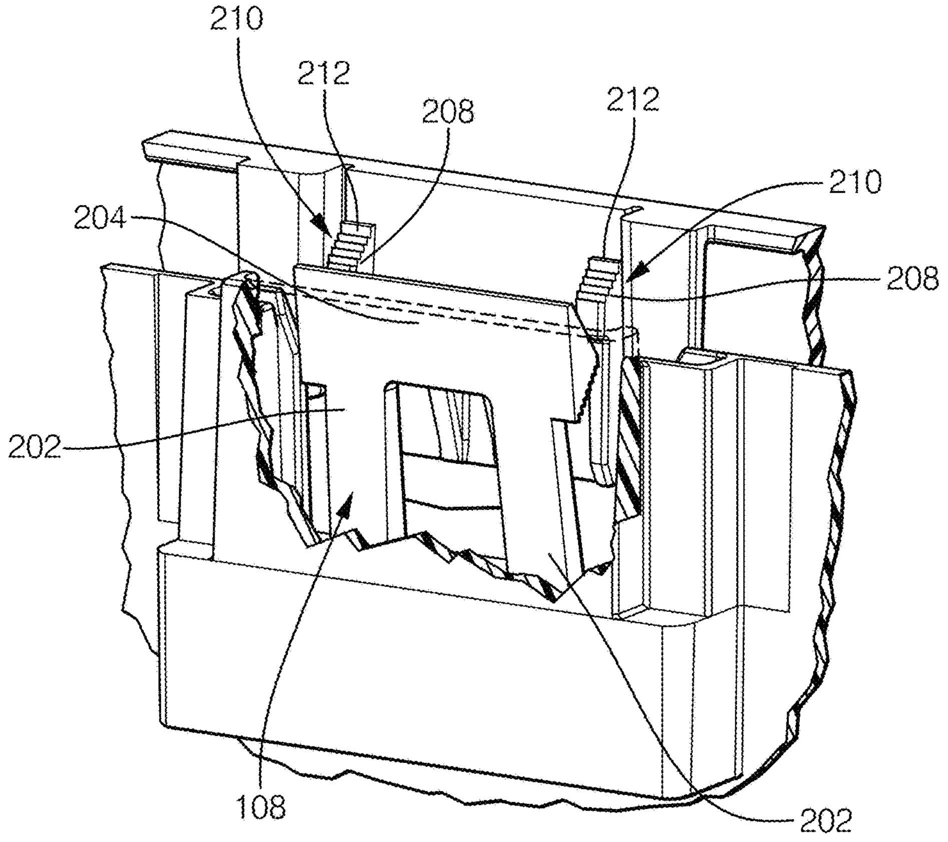
FIG. 3 illustrates an isometric view of the component attachment system during engagement according to some embodiments.
Figure 4:
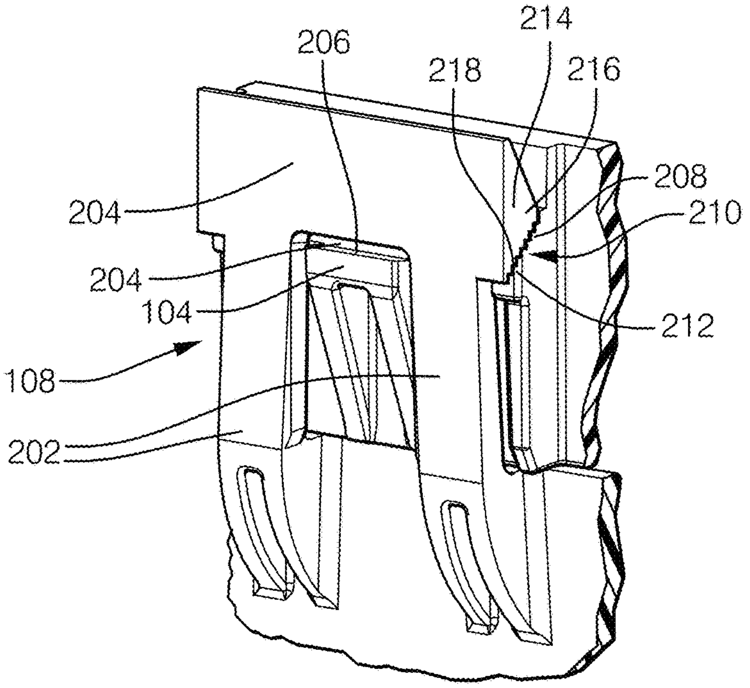
FIG. 4 illustrates an isometric view of the component attachment system following engagement according to some embodiments.

FIG. 1 shows a non-limiting example of an electrical assembly 100, in this example an automotive electrical distribution center, that includes first housing component 102, e.g., a base, defining a primary locking ramp 104 and a second housing component 106, e.g., a cover, having a primary locking latch 108 configured to engage the primary locking ramp 104 to secure second housing component 106 to first housing component 102. As shown in FIGS. 2-4, locking latch 108 has a pair of cantilever arms 202 that is terminated by latch arm 204, thereby forming a U-shaped locking latch. In this example, cantilever arms 202 are flexible and forward movement of latch arm 204 relative to locking ramp 104 allows latch arm 204 to engage locking ramp 104 by riding up and over locking ramp 104. Once latch arm 204 clears locking ramp 104, cantilever arms 202 return toward their original shape and backward movement of latch arm 204 is blocked by locking edge 206 of locking ramp 104. As shown in FIG. 4, gap 402 is defined between locking edge 206 and latch arm 204 when locking latch 108 is engaged with locking ramp 104. Locking latch 108 may be released from locking ramp 104 by prying latch arm 204 upwardly, thereby flexing cantilever arms 202 and allowing latch arm 204 to clear locking edge 206.

First housing component 102 also defines a pair of secondary locking features 208 located near or proximate to primary locking ramp 104. Secondary locking features 208 each have a first edge 210 which defines a first plurality of locking teeth 212 located near or proximate to locking ramp 104. In the illustrated example, secondary locking features 208 are located on each side of locking ramp 104 and slightly rearward thereof. Cantilever arms 202 of locking latch 108 also include complementary secondary locking features 214 each having a second edge 216 that defines a second plurality of locking teeth 218. The second plurality of locking teeth 218 engages the first plurality of locking teeth 212 as latch arm 204 engages locking edge 206 of locking ramp 104. Typically, several of these locking latches 108 and locking ramps 104 are used to attach first housing component 102 to second housing component 106.

Each tooth in the first and second pluralities of locking teeth 212, 218 has a generally triangular shape resulting in a saw-tooth or stair-step profile for first and second edges 210, 216. The first and second pluralities of locking teeth 212, 218 have complementary shapes so that the teeth of the first plurality of locking teeth 212 are received in the spaces between the teeth of the second plurality of locking teeth 218 and vice versa when locking latch 108 is engaged with locking ramp 104. The engagement of the first plurality of locking teeth 212 with the second plurality of locking teeth maintains a consistent distance of gap 402.

The first and second pluralities of locking teeth 212, 218 are shaped and arranged to inhibit backward movement of the locking latch 108 relative to the locking ramp 104 in order to maintain gap 402 between the latch arm and the locking edge. In order to do this, the first plurality of locking teeth 212 on first edge may have a 1 to 2 degree backward slant and the second plurality of locking teeth 218 proximate to locking ramp 104 may have a corresponding 1° to 2° backward slant. The first and second pluralities of locking teeth 212, 218 may also be shaped and arranged to inhibit forward movement of locking latch 108 relative to locking ramp 104. The first and second pluralities of locking teeth 212, 218 are preferably shaped and arranged to allow locking latch 108 to be pried upwardly to disengage from locking ramp 104, and thereby allow first housing component 102 to be detached from second housing component 106.

Each tooth in the first and second pluralities of locking teeth 212, 218 is preferably smaller than gap 402. This allows the secondary locking features 208 to accommodate variations in gap size due to tolerances in the dimensions of locking ramp 104, locking latch 108, and first and second housing components 102, 106 due to manufacturing and assembly processes.

While the shape of the teeth of the illustrated first and second pluralities of locking teeth 212, 218 have a stairstep or a sawtooth shape, other embodiments of the first and second pluralities of locking teeth may be envisioned in which the teeth have a trapezoidal or rectangular shape.

While locking latch 108 in the illustrated example has flexible cantilever arms, other embodiments may be envisioned in which the locking latch is rigid and the locking ramp is disposed on a flexible cantilevered tab defined by the first component. Further, while locking latch 108 in the illustrated example has a pair of flexible cantilever arms 202 with a latch arm 204 therebetween forming a generally U-shaped configuration, other embodiments may be envisioned in which the locking latch has a single flexible cantilever arm with a locking latch extending therefrom forming a generally L-shaped configuration.

Secondary locking features 208, 214 of the component attachment system described herein provide the following benefits:

- Reducing or eliminating shearing of locking ramp 104 or fracturing of locking latch 108 due to relative motion between first and second housing components 102, 106 being impeded by secondary locking features 208, 214. The shearing of locking ramp 104 or fracturing of locking latch 108 could cause undesirable uncontrolled separation or detachment of first housing component 102 from second housing component 106.
- Reducing or eliminating objectionable rattling noises caused by the relative motion between locking ramp 104 and locking latch 108 or first and second housing components 102, 106.
- Reducing manufacturing tooling cost by avoiding the need to maintain close tight tolerances in the manufacturing process to reduce the movement between locking ramp 104 and locking latch 108 and thereby first and second housing components 102, 106.
- Improving functionality of water protection labyrinths between first and second housing components 102, 106 by secondary locking features 208, 214 narrowing a distance between the first and second housing components 102, 106 to a distance less than that allowed by primary locking ramp 104 and locking latch 108.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical assembly, comprising:

a first housing component defining a locking ramp and a first secondary lock having a first edge defining a first plurality of locking teeth having a saw-tooth profile located proximate to the locking ramp; and a second housing component defining a locking latch having a cantilevered arm terminated by a latch arm configured to engage the locking ramp by riding up and over the locking ramp configured to secure the second housing component to the first housing component, wherein the cantilevered arm includes a second secondary lock having a second edge defining a second plurality of locking teeth having a corresponding saw-tooth profile that engages the first plurality of locking teeth as the latch engages the locking ramp.

2. The electrical assembly in accordance with claim 1, wherein a gap is defined between a locking edge of the locking ramp and the latch arm when the locking latch is engaged with the locking ramp and wherein the engagement of the first plurality of locking teeth with the second plurality of locking teeth maintains a distance of the gap.

3. The electrical assembly in accordance with claim 2, wherein each tooth defined by the first and second pluralities of locking teeth is smaller than the gap.

4. The electrical assembly in accordance with claim 1, wherein the first and second pluralities of locking teeth have complementary shapes.

5. An electrical assembly, comprising:

a first housing component defining a locking ramp and a first secondary lock having a first edge defining a first plurality of locking teeth located proximate to the locking ramp; and a second housing component defining a locking latch having a cantilevered arm terminated by a latch arm configured to engage the locking ramp by riding up and over the locking ramp configured to secure the second housing component to the first housing component, the cantilevered arm includes a second secondary lock having a second edge defining a second plurality of locking teeth that engages the first plurality of locking teeth as the latch engages the locking ramp, the first secondary lock further includes a third plurality of locking teeth located proximate to the locking ramp, the cantilevered arm is a first cantilevered arm and the locking latch has a second cantilevered arm terminated by the latch arm, and the second cantilevered arm also defines the second secondary lock having a fourth plurality of locking teeth that engages the third plurality of locking teeth as the latch engages the locking ramp.

6. The electrical assembly in accordance with claim 5, wherein the first and second cantilever arms are flexible.

7. The electrical assembly in accordance with claim 5, wherein the third and fourth pluralities of locking teeth have complementary shapes.

8. The electrical assembly in accordance with claim 7, wherein a shape of each tooth of the third and fourth pluralities of locking teeth is selected from a list consisting of a stairstep shape and a sawtooth shape.

9. A system for attaching a first component to a second component, comprising:

a locking ramp and a first secondary lock attached to the first component, the first secondary lock having a first plurality of locking teeth having a saw-tooth profile located proximate to the locking ramp; and a locking latch having a cantilevered arm attached to the second component and terminated by a latch arm, wherein the locking latch is configured to engage the locking ramp when the latch arm rides up and over the locking ramp and wherein the cantilevered arm includes a second secondary lock having a second plurality of locking teeth having a corresponding saw-tooth profile that engages the first plurality of locking teeth as the latch engages the locking ramp.

10. The system in accordance with claim 9, wherein a gap is defined between a locking edge of the locking ramp and the latch arm when the locking latch is engaged with the locking ramp and wherein the engagement of the first plurality of locking teeth with the second plurality of locking teeth maintains a distance of the gap.

11. The system in accordance with claim 10, wherein each tooth defined by the first and second pluralities of locking teeth is smaller than the gap.

12. The system in accordance with claim 9, wherein the first and second pluralities of locking teeth have complementary shapes.

13. A system for attaching a first component to a second component, comprising:

a locking ramp and a first secondary lock attached to the first component, the first secondary lock having a first plurality of locking teeth located proximate to the locking ramp; and a locking latch having a cantilevered arm attached to the second component and terminated by a latch arm, the locking latch is configured to engage the locking ramp when the latch arm rides up and over the locking ramp and wherein the cantilevered arm includes a second secondary lock having a second plurality of locking teeth that engages the first plurality of locking teeth as the latch engages the locking ramp, the first secondary lock further includes a third plurality of locking teeth located proximate to the locking ramp, the cantilevered arm is a first cantilevered arm and the locking latch has a second cantilevered arm terminated by the latch arm, and the second cantilevered arm also defines the second secondary lock having a fourth plurality of locking teeth that engages the third plurality of locking teeth as the latch engages the locking ramp.

14. The system in accordance with claim 13, wherein the first and second cantilever arms are flexible.

15. The system in accordance with claim 13, wherein the third and fourth pluralities of locking teeth have complementary shapes.

16. The system in accordance with claim 15, wherein a shape of each tooth of the third and fourth pluralities of locking teeth is selected from a list consisting of a stairstep shape, a sawtooth shape, and a rectangular shape.

* * * * *